C. F GROS.
RUNNING GEAR FOR AUTOMOBILE VEHICLES.
APPLICATION FILED MAY 2, 1910.
1,106,705.
Patented Aug. 11, 1914.
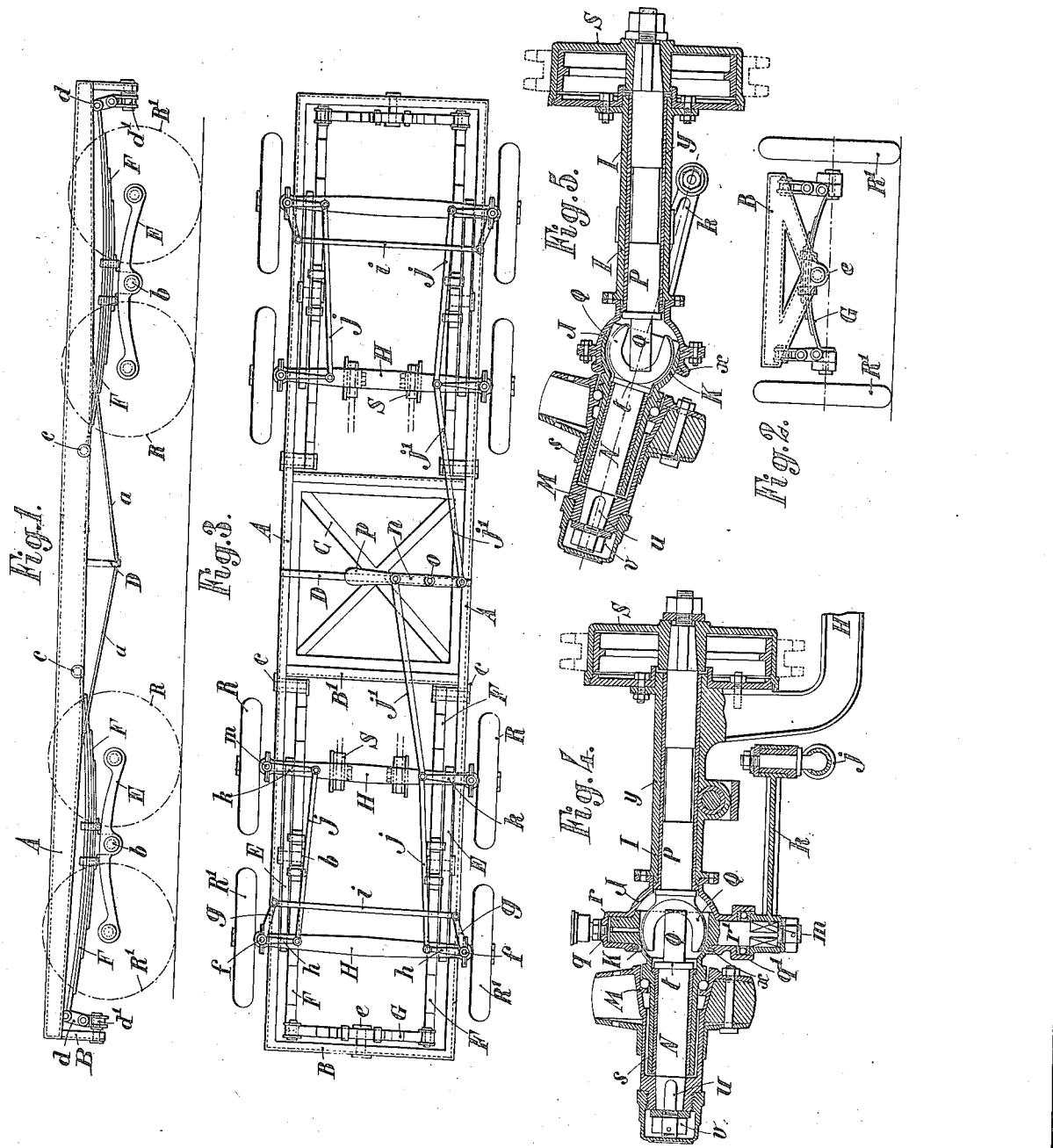

UNITED STATES PATENT OFFICE.

CLAUDE FRANÇOIS GROS, OF PUTEAUX, FRANCE.

RUNNING-GEAR FOR AUTOMOBILE VEHICLES.

1,106,705.

Specification of Letters Patent. Patented Aug. 11, 1914.

Application filed May 2, 1910. Serial No. 559,030.

*To all whom it may concern:*

Be it known that I, CLAUDE FRANÇOIS GROS, citizen of the French Republic, residing at Puteaux, Department of the Seine, in France, have invented certain new and useful Improvements in Running-Gears for Automobile Vehicles; and I do hereby declare the following to be a full, clear, and exact description of the invention, such as will enable others skilled in the art to which it appertains to make and use the same.

This invention relates to running gear for automobiles, and more particularly to automobiles having more than four wheels.

The object of the invention is to distribute the weight of the vehicle uniformly over a comparatively large number of supporting points, and to furnish a strong yet flexible suspension system for the axles, so that all of the wheels will rest uniformly on the ground and adapt themselves readily to all inequalities of the road.

I have illustrated my improvements as applied to a vehicle having eight wheels, but it should be understood that the number of wheels can be varied without departing from the invention and that several features of the construction can be used in other applications.

In the drawings, Figure 1 is a longitudinal elevation of the frame provided with its eight wheels. Fig. 2 is an end elevation. Fig. 3 is an underneath plan view. Fig. 4 is a longitudinal section of an end of a driving axle drawn to a larger scale. Fig. 5 is a corresponding horizontal section with the wheel deflected relatively to the axle.

The vehicle frame proper consists of two longitudinal members A united by end cross members B and intermediate cross members B' with a recessed median platform C; a cross member D arranged at the middle serves for fixing the stays *a* the ends of which terminate at the longitudinal members A thereby suitably strengthening the frame. The eight wheels of the frame are grouped in fours; each group comprises a pair of driving wheels R and a pair of support wheels R'. The two axles of the same group are united on each side by a longitudinal support E which is jointed at *b* to a part rigid with a long spring F; each of these springs F is connected with the frame by a joint *c* or if necessary by a suspension link and the other end is connected by a combination system of two links jointed at right angles *d d'* to one end of a transverse spring G. This transverse spring, at the ends of which the ends of two long longitudinal springs F thus terminate is able to oscillate at its middle around a pivot *e* fixed to the extreme cross member.

It will be understood that owing to this suspension of a group of four wheels at each end of the frame great flexibility of the joints is obtained; the wheels, while always resting on the ground are able to follow its inequalities without straining the frame and the mechanical parts of the vehicle or fatiguing or causing inconvenience to the passengers. A constant and uniform distribution of the load over all the points of support, however numerous these may be, is obtained.

All the wheels of this eight-wheel vehicle may be deflected in either direction to a greater or less extent for steering; with this object each wheel, that is to say both the driving wheels R which are nearest to the center of the frame and the wheels R' which are merely supporting wheels and which are located at the ends of the frame is mounted on a spindle jointed to the end of the axle proper H which is fixed. The driving wheels are, however, steering wheels also equally with the front and rear supporting wheels.

At the ends of each of the axles, *f* is the vertical steering pivot of the wheel spindle.

The steering pivots *f* of the two extreme axles carry two arms *g h*; the arms *g q* are connected one with the other by a connecting rod *i* while one of the arms *h* of a wheel R'' is connected by a connecting rod *j* with the arm *k* of the vertical pivot *m* of the adjacent driving wheel R. The arrangement is the same for the two ends of the frame; on each side one of the connecting rods *j* is prolonged to *j'* as far as a balance beam *n* pivoted at *o* and provided with a lever *p* which is connected in any suitable manner with steering gear within reach of the driver. In acting upon this lever *p* the beam *n* actuates the two groups of rods *j' j* which simultaneously act upon the four wheels on one side; by the rods *i* and the two other rods *j* an angular displacement is imparted to the wheels on the other side of the vehicle in such a manner that the eight wheels are all displaced angularly in the same direction. The lengths of the levers *h* and *k* of the various wheels are such that the spindles upon which the driving or supporting wheels rotate all converge to the center of the curve to be traversed by the vehicle, whatever the variations of this curvature may be.

In what has been stated it has been assumed that the two middle pairs of wheels were driving wheels but the number of driving wheels might be increased and all eight wheels might be driving wheels. The axles of the two extreme supporting wheels are ordinary steering axles but the axles of the driving wheels are both driving and steering axles. Figs. 4 and 5 show, by way of example only, the manner in which the ends of the driving axles can be combined.

The fixed part H of the axle ends at each extremity in a hollow socket I to which a box J in two parts is bolted; this box presents two vertical sockets $q$ and $q'$ in line one with the other, which guide and support two trunnions $r\ r'$ rigid with the horizontal stub shaft K which serves as axis of rotation for the hub M of the wheel. Inside the socket K a shaft or spindle N is mounted with the interposition of a bronze sleeve $s$; the head $t$ of this spindle serves as an inner stop while the end of this spindle N is fixed by a key $u$ to the hub of the wheel and it is provided with a screw-threaded portion for the reception of a lock nut $v$ which bears on the end of the hub M of the wheel. Naturally the rotation of the hub of the wheel upon the cylindrical box or socket K and also the oscillation of the vertical pivots $r$ and $r'$ take place on ball bearings. A packing $x$ forming a good joint arranged in a groove formed on the periphery of the open part of the box J prevents the dust from penetrating to the interior of the joint of the said box J.

Fig. 4 shows the arm $k$ mounted on the square part $m$ of the pivot $r'$ and at the extremity of this arm the connecting rod $j$ is jointed.

The sleeve or socket I forming a prolongation of the axle H serves as a guide for the inner shaft P which may be cut away at the middle so as to present only two extreme journals; a bronze sleeve $y$ surrounds this shaft. The shaft P ends in the box I in an ordinary Cardan joint Q which establishes the connection with the shaft N driving the hub of the wheel. On the opposite side from this transmission gear the shaft P receives a pulley S either toothed or otherwise which is driven by a chain or other transmission. The driving may be by means of an explosion, electric or other suitable motor.

I claim:

1. In running gear for vehicles, the combination of a frame, a group of four wheels supporting the frame at each end, driving mechanism connected only with the two inner pairs of wheels, the end pairs being merely supporting wheels, and a single manually operable mechanism to steer all of the wheels from a common point.

2. In a running gear for vehicles, the combination of a frame, a pair of axles extending across the frame at each end of the same, wheels on said axles, a spring structure supporting the frame from each pair of axles as a unit, said spring structure comprising transverse springs pivoted to the vehicle frame, and longitudinal springs connected at one end to the vehicle frame and at the other end to the extremities of said transverse springs, said longitudinal springs adapted to support the vehicle frame over said axles, and means to drive said vehicle.

In testimony whereof I affix my signature, in presence of two witnesses.

CLAUDE FRANÇOIS GROS.

Witnesses:
 Louis Josse,
 H. C. Coxe.